United States Patent
Tripathi et al.

(10) Patent No.: US 12,075,484 B2
(45) Date of Patent: Aug. 27, 2024

(54) METHOD AND APPARATUS FOR UE REPORTING FOR SON-BASED RANDOM ACCESS OPERATIONS

(71) Applicant: Samsung Electronics Co., Ltd., Suwon-si (KR)

(72) Inventors: Nishithkumar D. Tripathi, Parker, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 17/692,952

(22) Filed: Mar. 11, 2022

(65) Prior Publication Data

US 2022/0304066 A1   Sep. 22, 2022

Related U.S. Application Data

(60) Provisional application No. 63/161,598, filed on Mar. 16, 2021, provisional application No. 63/182,528, filed on Apr. 30, 2021.

(51) Int. Cl.
*H04W 74/0833* (2024.01)

(52) U.S. Cl.
CPC .............................. *H04W 74/0833* (2013.01)

(58) Field of Classification Search
None
See application file for complete search history.

(56) References Cited

U.S. PATENT DOCUMENTS

| | | | |
|---|---|---|---|
| 2020/0252973 A1 | 8/2020 | Zhang et al. | |
| 2020/0260498 A1* | 8/2020 | Xu | H04W 74/0833 |
| 2020/0344812 A1 | 10/2020 | Agiwal et al. | |
| 2022/0279585 A1 | 9/2022 | Jang et al. | |
| 2023/0284313 A1* | 9/2023 | Zhu | H04W 72/12 |

FOREIGN PATENT DOCUMENTS

| | | |
|---|---|---|
| WO | 2020159751 A1 | 8/2020 |
| WO | 2020226387 A1 | 11/2020 |
| WO | 2021020822 A1 | 2/2021 |

OTHER PUBLICATIONS

"5G; NR; Physical channels and modulation (3GPP TS 38.211 version 16.4.0 Release 16)", ETSI TS 138 211 V16.4.0, Jan. 2021, 137 pages.
"5G; NR; Multiplexing and channel coding (3GPP TS 38.212 version 16.4.0 Release 16)", ETSI TS 138 212 V16.4.0, Jan. 2021, 155 pages.

(Continued)

*Primary Examiner* — Anh Ngoc M Nguyen

(57) ABSTRACT

Methods and apparatuses for random access (RA) operation in a wireless communication system. A method of operating a first user equipment (UE) comprises: receiving, from a base station (BS), configuration information for a first RA procedure; storing part of the configuration information; generating and storing information indicating that a fallback operation is triggered, during the RA operation, to a second RA procedure from the first RA procedure per RA attempt; and transmitting, to the BS, RA information including the stored part of the configuration information and the stored information.

20 Claims, 13 Drawing Sheets

(56) References Cited

OTHER PUBLICATIONS

"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Medium Access Control (MAC) protocol specification (3GPP TS 38.321 version 16.3.0 Release 16)", ETSI TS 138 321 V16.3.0, Jan. 2021, 158 pages.
"5G; NR; Radio Resource Control (RRC); Protocol specification (3GPP TS 38.331 version 16.3.1 Release 16)", ETSI TS 138 331 V16.3.1, Jan. 2021, 902 pages.
International Search Report and Written Opinion issued Jun. 22, 2022 regarding International Application No. PCT/KR2022/003668, 7 pages.
Vivo, "Discussion on contents and signalling model of 2-step RACH report", 3GPP TSG-RAN WG2 Meeting #113, R2-2100698, Jan. 2021, 4 pages.

* cited by examiner

METHOD AND APPARATUS FOR UE REPORTING FOR SON-BASED RANDOM ACCESS OPERATIONS

CROSS-REFERENCE TO RELATED APPLICATIONS AND CLAIM OF PRIORITY

The present application claims priority to U.S. Provisional Patent Application No. 63/161,598, filed on Mar. 16, 2021, and U.S. Provisional Patent Application No. 63/182,528, filed on Apr. 30, 2021. The content of the above-identified patent document is incorporated herein by reference.

TECHNICAL FIELD

The present disclosure relates generally to wireless communication systems and, more specifically, the present disclosure relates to an enhanced user equipment (UE) reporting for self-organizing network (SON)-based random access operations in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to an enhanced UE reporting for SON-based random access operations in a wireless communication system.

In one embodiment, a UE in a wireless communication system for a random access (RA) operation is provided. The UE comprises: memory, a transceiver configured to receive, from a base station (BS), configuration information for a first RA procedure, and a processor operably coupled to the memory and the transceiver, the processor configured to: store, in the memory, part of the configuration information, and generate and store information indicating that a fallback operation is triggered, during the RA operation, to a second RA procedure from the first RA procedure per RA attempt, wherein the transceiver is further configured to transmit, to the BS, RA information including the stored part of the configuration information and the stored information.

In another embodiment, a BS in a wireless communication system for an RA operation is provided. The BS comprises: a processor and a transceiver operably coupled to the processor, the transceiver configured to: transmit, to a UE, configuration information for a first RA procedure; and receive, from the UE, RA information including part of the configuration information and information indicating that the UE triggers a fallback operation, during the RA operation, to a second RA procedure from the first RA procedure per RA attempt, wherein the part of the configuration information and the information are stored at the UE.

In yet another embodiment, a method of a UE in a wireless communication system for an RA operation. The method comprises: receiving, from a BS, configuration information for a first RA procedure; storing part of the configuration information; generating and storing information indicating that a fallback operation is triggered, during the RA operation, to a second RA procedure from the first RA procedure per RA attempt; and transmitting, to the BS, RA information including the stored part of the configuration information and the stored information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.4.0, "NR; Physical channels and modulation"; 3GPP TS 38.212 v16.4.0, "NR; Multiplexing and Channel coding"; 3GPP TS 38.213 v16.4.0, "NR; Physical Layer Procedures for Control"; 3GPP TS 38.214 v16.4.0, "NR; Physical Layer Procedures for Data"; 3GPP TS 38.321 v16.3.0, "NR; Medium Access Control (MAC) protocol specification"; and 3GPP TS 38.331 v16.3.1, "NR; Radio Resource Control (RRC) Protocol Specification."

Figure 1:
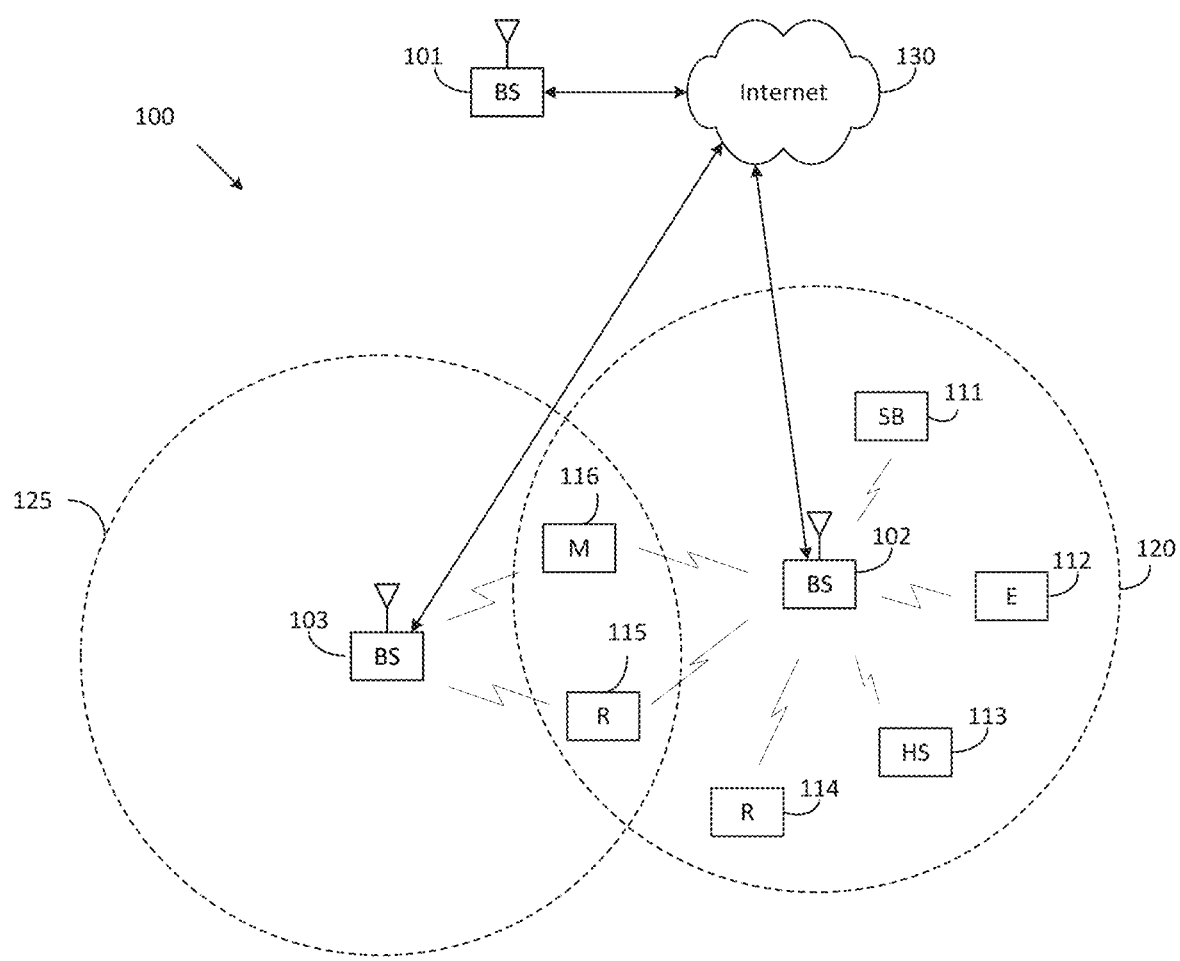
FIG. 1 illustrates an example of wireless network according to embodiments of the present disclosure.
Figure 2:
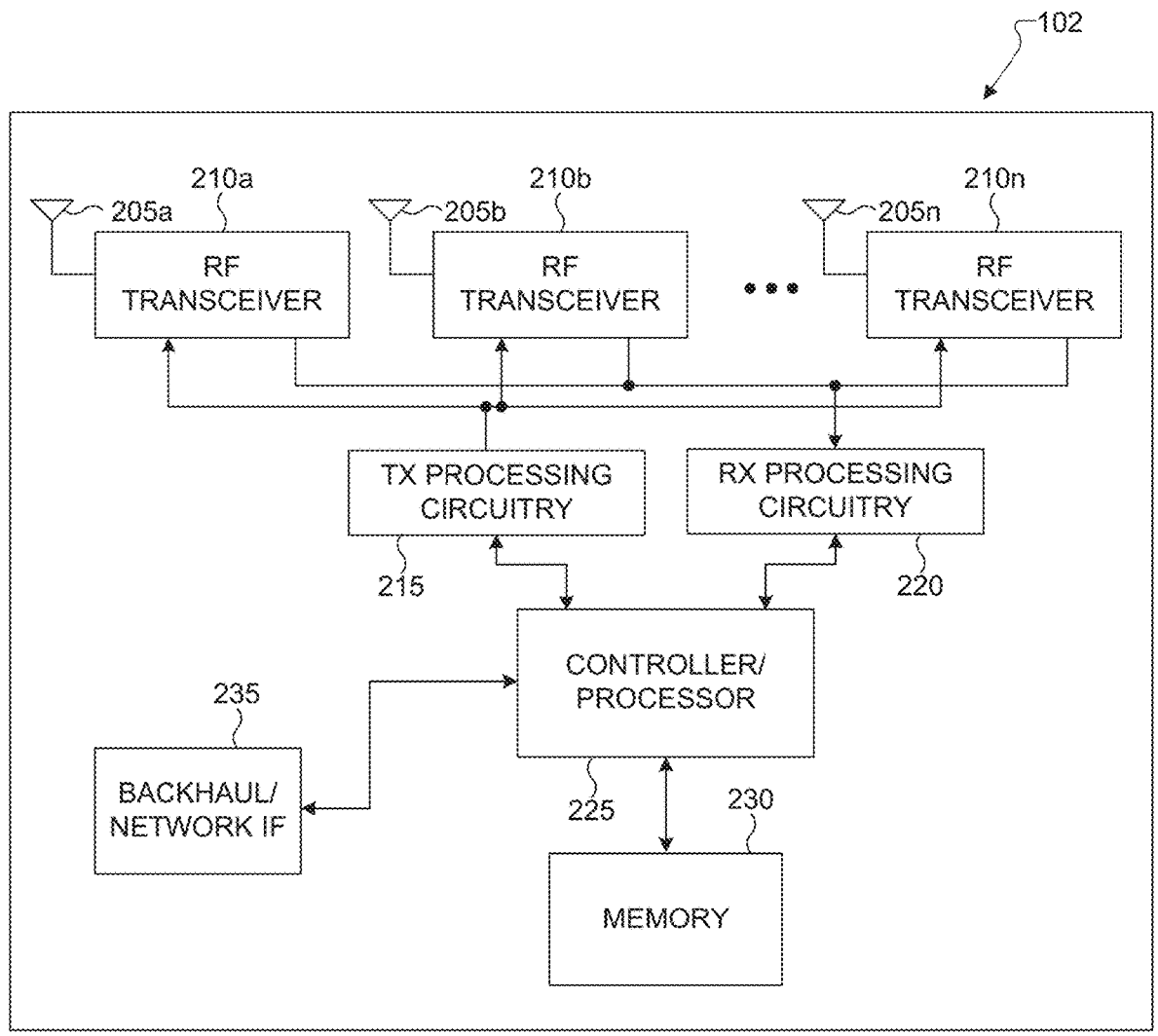
FIG. 2 illustrates an example of gNB according to embodiments of the present disclosure.
Figure 3:
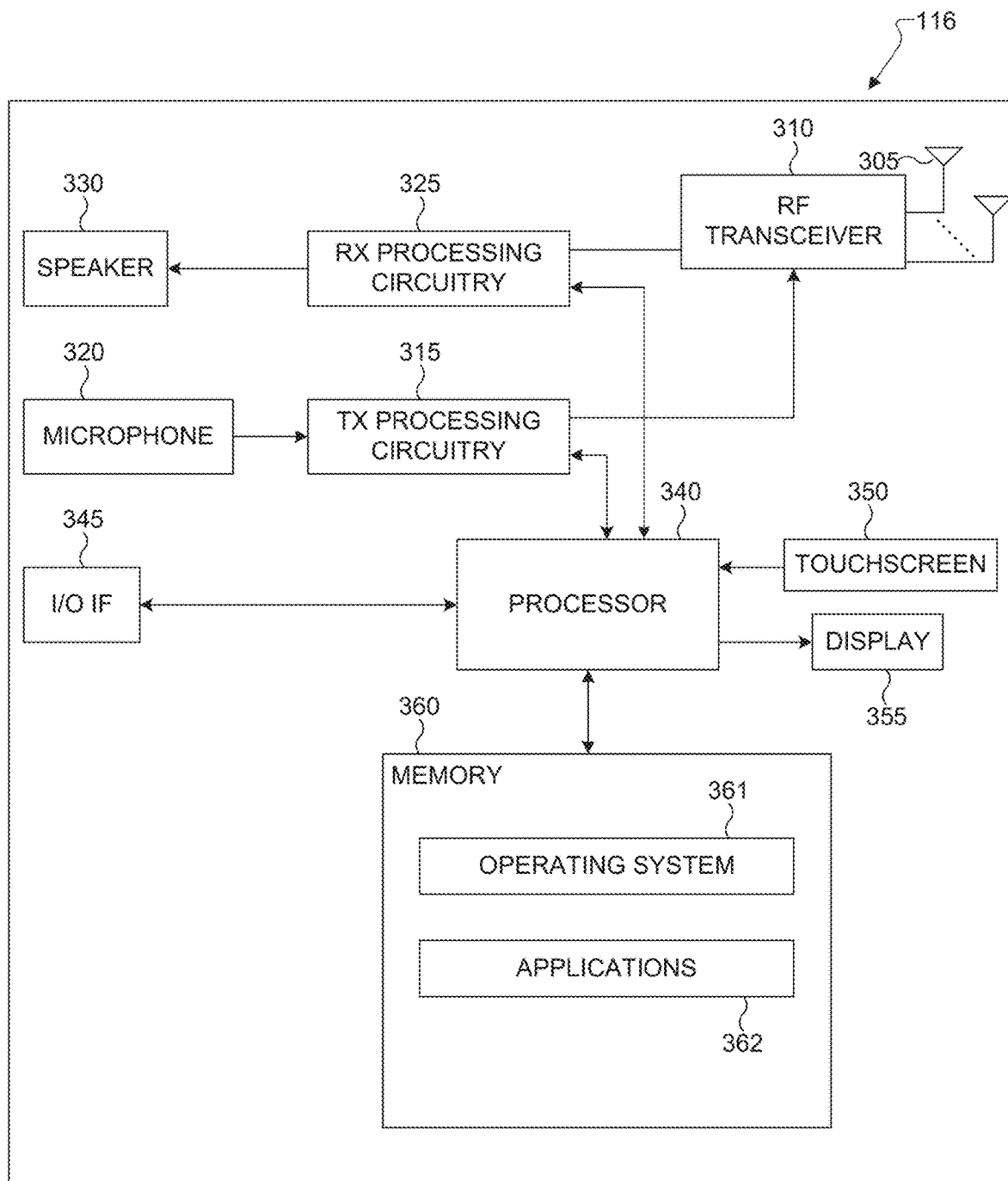
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for an enhanced UE reporting for SON-based random access optimization in a wireless communication system. In certain embodiments, and one or more of the gNBs 101-103 includes circuitry, programing, or a combination thereof, for an enhanced UE reporting for SON-based random access optimization in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support an enhanced UE reporting for SON-based random access optimization in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for an enhanced UE reporting for SON-based random access optimization in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
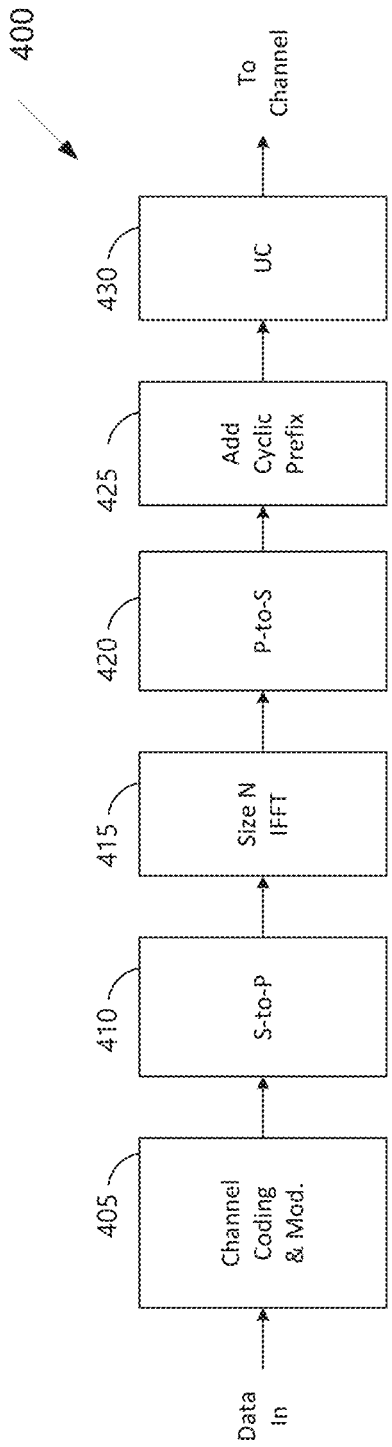
FIGS. 4 and 5 illustrate example of wireless transmit and receive paths according to this disclosure.
Figure 5:
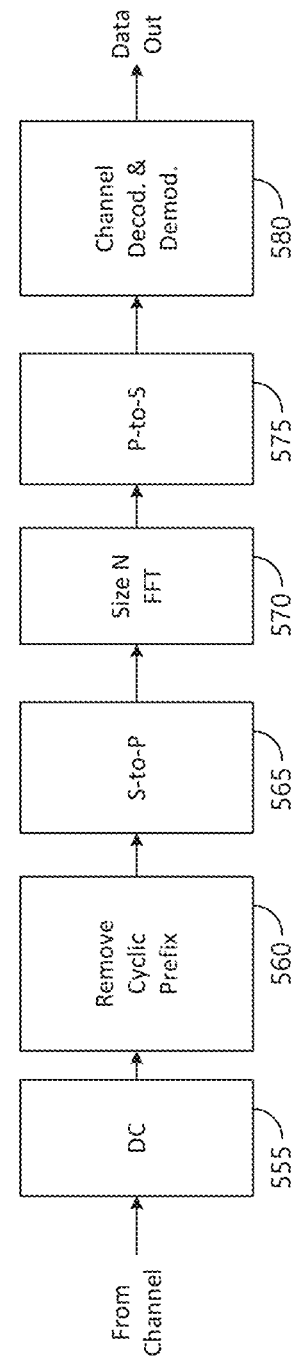

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

To meet the demand for wireless data traffic having increased since deployment of 4G communication systems, and to enable various vertical applications, 5G communication systems have been developed and are currently being deployed.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large-scale antenna techniques are discussed in 5G communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 6:
FIG. 6 illustrate an example of mechanism of enhanced UE reporting according to embodiments of the present disclosure.

FIG. 6 illustrate an example of mechanism of enhanced UE reporting 600 according to embodiments of the present disclosure. An embodiment of the mechanism of enhanced UE reporting 600 shown in FIG. 6 is for illustration only.

FIG. 6 summarizes the overall mechanism of UE reporting in support of RA optimization by a SON entity.

As illustrated in FIG. 6, the UE observes events related to random access (e.g., number of preambles transmitted and any indications of power limits encountered) and records suitable measurements and indicators related to random access. Upon request by the gNB, the UE provides RA reports to the gNB. A SON entity obtains the UE reports as well as any additional gNB reports to optimize RA parameters. Such optimized RA parameters are conveyed to the relevant gNBs by the SON entity.

Figure 7:
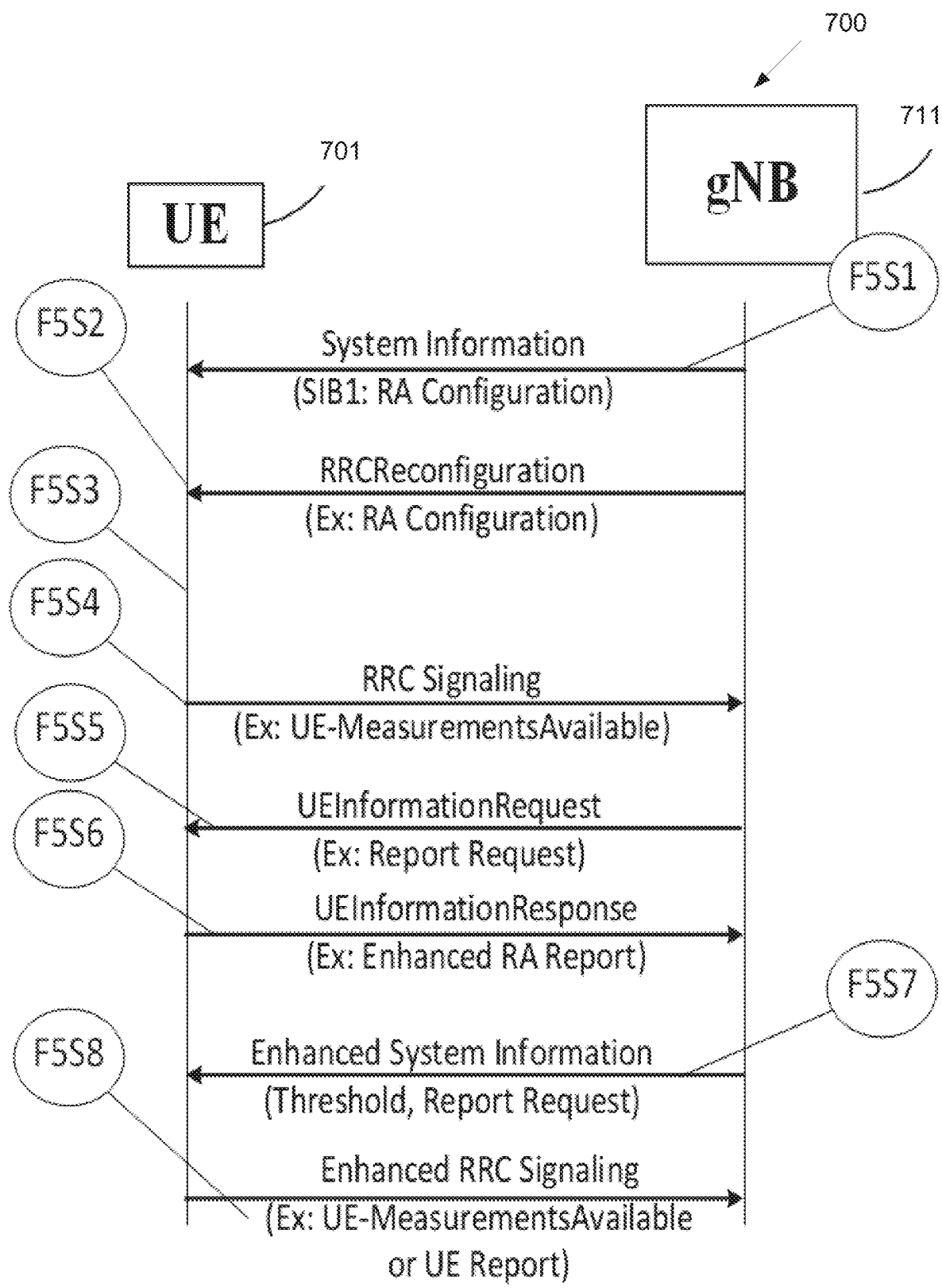
FIG. 7 illustrate an example of UE-network signaling procedure for enhanced RA reporting by the UE according to embodiments of the present disclosure.

FIG. 7 illustrate an example of UE-network signaling procedure 700 for enhanced RA reporting by the UE according to embodiments of the present disclosure. The UE-network signaling procedure 700 as may be performed by a UE (e.g., 111-116 as illustrated in FIG. 1) and a BS (e.g., 101-103 as illustrated in FIG. 1). An embodiment of the UE-network signaling procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, in Step F5S1, in an example approach, the gNB conveys RA parameters in SIB1. In an example approach, the gNB conveys one or more RA parameters in the information element (IE) servingCellConfigCommonSIB/UplinkConfigCommonSIB/BWP-UplinkCommon/RACH-ConfigCommon and BWP-UplinkCommon/msgA-ConfigCommon. The UE uses these parameters to carry out 4-step and 2-step random access procedures in the cell.

In Step F5S2, in an example approach, the gNB conveys RA parameters in a dedicated RRC signaling message such as RRCReconfiguration message. In an example approach, the gNB conveys one or more RA parameters in the IE rach-ConfigDedicated for a normal uplink and supplementary UL. This IE includes IEs such as CFRA (containing RACH-ConfigGeneric), RACH-ConfigGenericTwoStepRA, and msgA-PUSCH-Resource).

After receiving the RACH configuration in Step F5S1 and Step F5S2, the UE observes the RA events and records suitable measurements and indicators in Step F5S3. In various embodiments of the present disclosure, the UE records information related to supplementary uplink (SUL), carrier aggregation (CA), fallback from 2-step RA to 4-step RA, RA preamble transmit power, and beam failure recovery (BFR). Details of new information for RA reporting are given in FIG. 8.

In Step F5S4, the UE indicates to the gNB the availability of the RA report (and other reports such as connection establishment failure (CEF) and radio link failure (RLF) in the IE UE-MeasurementsAvailable in RRC messages such as RRCResumeComplete and RRCReestablishmentComplete in an example approach.

If the serving gNB wishes to retrieve the UE's reports (including the enhanced RA report for this disclosure), the gNB in Step F5S5 sends an RRC signaling message such as UEInformationRequest and identifies the report the gNB wants to retrieve. In an example approach, the gNB makes a request for one or more of the (enhanced) RA report, the CEF report, and the RLF report. In one example method, the gNB uses the IE "ra-ReportReq-r16" (or R17 or future release version) to request the UE to send the (enhanced) RA Report.

In Step F5S6, the UE responds with an RRC InformationResponse message and provides the enhanced RA report in an embodiment of the present disclosure. In an example approach, the enhanced RA reporting is provided in "RA-Report" IE (the R16 format is enhanced for R17 or a future release). Enhancements to the RA report are described in various embodiments of the present disclosure in FIG. 8.

In Step F5S7, the gNB may proactively seek UE's reports including the RA report by providing an indication in enhanced System Information (e.g., "reportRetrievalIndicator" or another IE that implies that the gNB wishes to retrieve the UE-stored reports including an RA report) in an example approach. In another approach, the gNB may also specify a threshold (e.g., "reportRetrievalThreshold") that is used by the UE to determine if the UE needs to provide a report to the gNB or not. In yet another approach, the gNB may specify different reports the gNB may want to retrieve and each report type may have a separate threshold that the UE utilizes to decide about sending of the report or the indication of the report.

In Step F5S8, the UE responds with an indication about the report availability in a new RRC message (e.g., "ReportForSON"), an enhanced RRC message (e.g., RRC Setup Request and RRC Setup Complete), or an existing RRC message (e.g., RRCResumeComplete and RRCReestablishmentComplete) in an example approach. In another approach, the UE directly provides the report instead of an indication.

Figure 8:
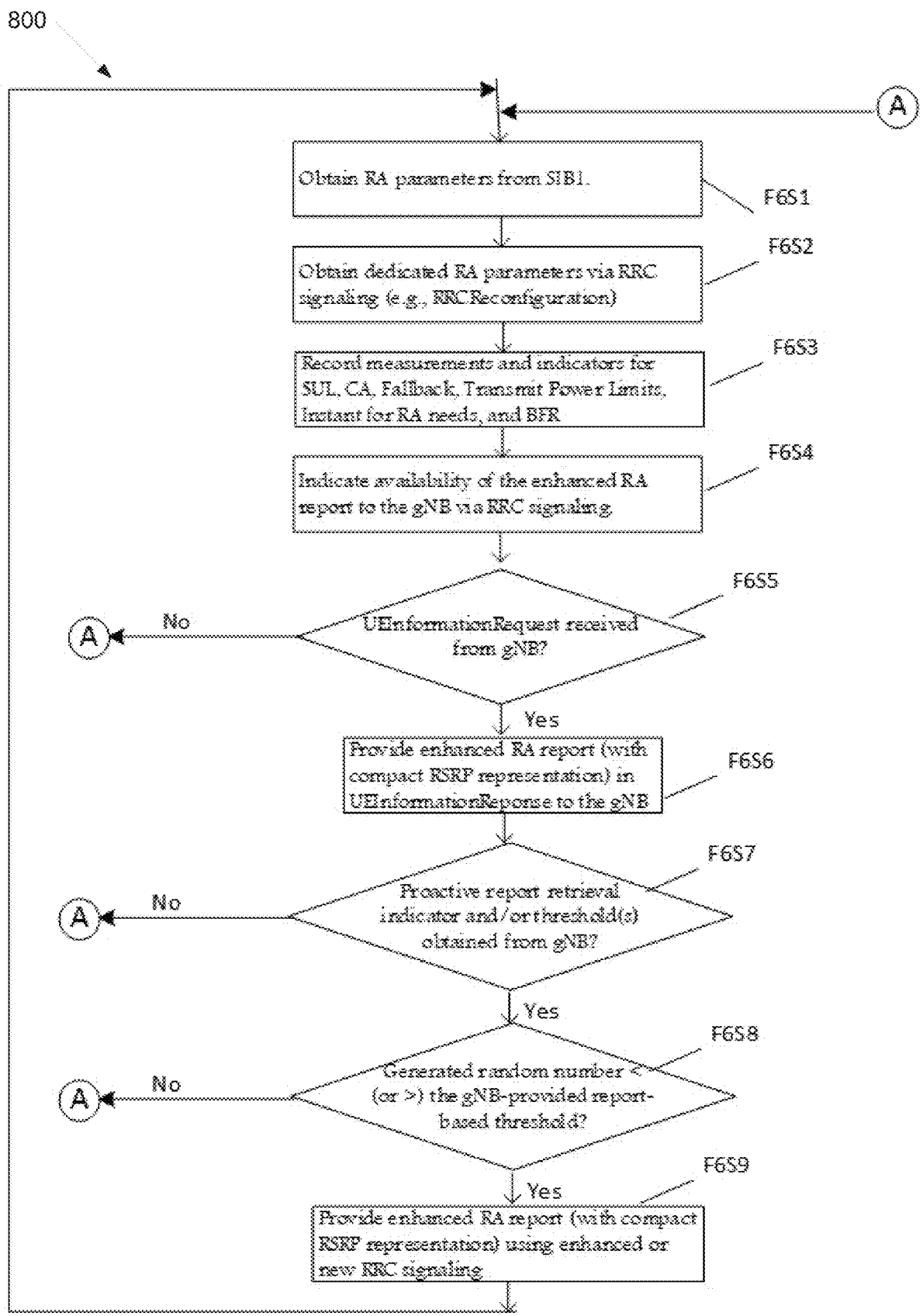
FIG. 8 illustrates an example of UE procedure for enhanced RA reporting by the UE according to embodiments of the present disclosure.

FIG. 8 illustrates an example of UE procedure 800 for enhanced RA reporting by the UE according to embodiments of the present disclosure. The UE procedure 800 as may be performed by a UE (e.g., 111-116 as illustrated in FIG. 1). An embodiment of the UE procedure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

In Step F6S1, in an example approach, the UE obtains RA parameters by observing SIB1 sent by the gNB. In an example approach, the UE retrieves one or more RA parameters from the IE servingCellConfigCommonSIB/UplinkConfigCommonSIB/BWP-UplinkCommon/RACH-ConfigCommon and BWP-UplinkCommon/msgA-ConfigCommon. The UE uses these parameters to carry out 4-step and 2-step random access procedures in the cell.

In Step F6S2, in an example approach, the UE obtains UE-specific RA parameters in a dedicated RRC signaling message such as RRCReconfiguration message. In an example approach, the UE obtains one or more RA parameters in the IE rach-ConfigDedicated for a normal uplink and supplementary UL. This IE includes IEs such as CFRA (containing RACH-ConfigGeneric), RACH-ConfigGenericTwoStepRA, and msgA-PUSCH-Resource).

After receiving the RACH configuration in Step F6S1 and Step F6S2, the UE observes the RA events and records suitable measurements and indicators in Step F6S3. In various embodiments of the present disclosure, the UE records information related to SUL, CA, fallback from 2-step RA to 4-step RA, RA preamble transmit power, and beam failure recovery (BFR).

In Step F6S3, in an embodiment of the present disclosure, the UE records an indicator whether the UE received the carrier for the SUL from the gNB via explicit signaling or not. In another approach, the UE records whether the RSRP of the downlink reference is less than the threshold rsrp-Threshold-SUL (if such threshold has been received from the gNB). In yet another approach, the UE records whether the RSRP of the downlink reference is greater than or equal to the threshold rsrp-Threshold-SUL. In another approach, the UE records RSRP of the downlink reference (possibly along with the threshold rsrp-Threshold-SUL) as an implicit indicator of the SUL. The carrier frequency can also be recorded and used as an implicit indicator of the use of the SUL instead of the normal UL (NUL).

In Step F6S3, in support of SUL selection, in an example approach, the UE reports rsrp-Threshold-SUL to the gNB if the UE has received such threshold from the gNB.

In Step F6S3, in an embodiment of the present disclosure, the UE records an indicator whether the contention resolution was cross-scheduled or not. In an example approach, when the contention resolution is cross-scheduled, the UE records the identity of the SCell. In another approach, the UE records identities of both PCell and SCell when the contention resolution is cross-scheduled.

In Step F6S3, in an embodiment of the present disclosure, the UE records an indicator whether the contention resolution was cross-scheduled or not. In an example approach, when the contention resolution is cross-scheduled, the UE records the identity of the SCell. In another approach, the UE records identities of both PCell and SCell when the contention resolution is cross-scheduled.

In Step F6S3, in an embodiment of the present disclosure, the UE records an indicator whether the detected contention resolution was a normal contention detection in a 2-step RA procedure (e.g., "contentionDetectedWithoutFallback") or a contention detection for the fallback where the UE has fallen back to 4-step RA procedure from the 2-step RA procedure (e.g., "contentionDetectedWithFallback"). Note Rel-16 "contentionDetected" indicator is reported as shown in TABLE 1.

TABLE 1

ContentionDetected indicator

| PerRAAttemptInfo-r16 ::= | SEQUENCE { | |
|---|---|---|
| contentionDetected-r16 | BOOLEAN | OPTIONAL, |
| dlRSRPAboveThreshold-r16 | BOOLEAN | OPTIONAL, |
| ... | | |
| } | | |

In Step F6S3, in an embodiment of the present disclosure, the UE records an indicator whether the UE could not transmit a PRACH due to the power limitation arising from the power allocation related to PUSCH/PUCCH/PRACH/SRS transmissions. In an example approach, the UE records if the UE reached the transmit power limit for the PRACH due to the power allocation related to PUSCH/PUCCH/PRACH/SRS transmissions.

In Step F6S3, in an embodiment of the present disclosure, the UE records an indicator whether the UE could not transmit a PRACH due to the power limitation arising from the power allocation related to MR-DC (e.g., EN-DC, NE-DC, or NR-DC). In an example approach, the UE records if the UE reached the transmit power limit for the PRACH due to the power allocation related to MR-DC (e.g., EN-DC, NE-DC, or NR-DC).

In Step F6S3, in an embodiment of the present disclosure, the UE records an indicator whether the UE had to reduce its PRACH transmission power due to the power limitation arising from the power allocation related to PUSCH/PUCCH/PRACH/SRS transmissions or MR-DC (e.g., EN-DC, NE-DC, or NR-DC).

In Step F6S3, in an embodiment of the present disclosure, the UE records the cause for the PRACH power transmission constraint (e.g., cause=PUSCH/PUCCH/PRACH/SRS transmissions or MR-DC related constraint, where MR-DC may be).

In Step F6S3, in an embodiment of the present disclosure, the UE records (and reports in Step F6S6 and F6S9) the thresholds such as the maximum E-UTRA/LTE power p-MaxEUTRA, the maximum NR power $P_{NR}$, the maximum EN-DC power $P_{Total}^{EN-DC}$, the maximum NE-DC power $P_{Total}^{NE-DC}$, and the maximum NR-DC power $P_{Total}^{NR-DC}$, (in dB values or linear values) to the gNB in support of various flavors of MR-DC such as EN-DC, NE-DC, and NR-DC.

In Step F6S3, in an embodiment, the UE records (and reports in Step F6S6 and F6S9) the threshold msgA-deltaPreamble.

In Step F6S3, in an embodiment of the present disclosure, the UE records the instant when the need for the RA procedure is identified ("instantRandomAccessNeeded"). This time can be a GNSS-based time or can be based on 5G timing structure (e.g., frame, slot, symbol #), or a combination of the two. This can help the network determine true or accurate access delay.

In Step F6S3, in an embodiment of the present disclosure, the UE records the RSRPs of beams and cells that meet a signal threshold criterion when BFR is attempted. In another approach, the UE records the RSRPs of beams and cells that exceed the RSRP of the selected beam and cell.

In Step F6S4, the UE indicates to the gNB the availability of the RA report (and other reports such as connection establishment failure (CEF) and radio link failure (RLF)) in the IE UE-MeasurementsAvailable in RRC messages such as RRCResumeComplete and RRCReestablishmentComplete in an example approach.

In Step F6S5, the UE checks if the serving gNB wishes to retrieve the UE's reports (including the enhanced RA report for this disclosure). If the UE receives an RRC signaling message such as UEInformationRequest, the UE goes to Step F6S6. Otherwise, the UE goes to Step F6S1.

In Step F6S6, the UE responds with an RRC InformationResponse message and provides the enhanced RA report in an embodiment of the present disclosure. The UE provides to the gNB one or more of the indicators and measurements specified in Step F6S3. In another approach, a different RRC signaling message is used by the UE to convey one or more of the indicators and measurements specified in Step F6S3.

In Step F6S6, in an example approach, the UE includes the transmit power configurations that the UE used for the random access procedure (e.g., preambleReceivedTargetPower and power step size) in the RRC InformationResponse message. Note that the UE can include other part of the configuration for 2-step RA.

In Step F6S6, in an example approach, when the UE includes RSRP measurements, the UE uses a compact representation to reduce the signaling overhead. In an example approach, a reference RSRP value is defined and all other RSRPs are specified relative to such reference power level. In another approach, the first RSRP measurement is fully specified and specifying all other RSRPs are specified relative to this first value.

In yet another approach, a formula is specified for the absolute or relative RSRP measurement: RSRP=RSRP-Reference+stepSize*IndicatedValue.

The default value of stepSize can be defined to be X dB (e.g., 1 dB) in an example approach. In another approach, stepSize value is signaled.

In Step F6S7, in an example approach, the UE checks if the gNB is proactively seeking UE's reports including the RA report by observing an indication in enhanced System Information (e.g., "reportRetrievalIndicator" or another IE that implies that the gNB wishes to retrieve the UE-stored reports including an RA report). If the gNB has indicated a report retrieval and/or associated threshold(s), the UE goes to Step F6S8; otherwise, the UE goes to Step F6S1. In another approach, the UE obtains the time period after which the UE can retry the evaluation (i.e., random number generation and comparison with one or more relevant threshold(s) summarized in Step F6S8).

In Step F6S8, the UE utilizes a threshold (e.g., "reportRetrievalThreshold") to determine if the UE needs to provide a report to the gNB or not. For example, if a random number generated by the UE is above (or below) a threshold such as "reportRetrievalThreshold," the UE goes to Step F6S9; otherwise, the UE goes to Step F6S1.

In Step F6S8, in another approach, the UE considers multiple report-specific thresholds (e.g., RA report threshold, RLF report threshold, and CEF report threshold) that gNB may have specified to decide about sending of the report or the indication of the report.

In Step F6S9, in an example approach, the UE responds with an indication about the report availability in a new RRC message (e.g., "ReportForSON"), an enhanced RRC message (e.g., RRC Setup Request and RRC Setup Complete), or an existing RRC message (e.g., RRCResumeComplete and RRCReestablishmentComplete). In another approach, the UE directly provides the report to the gNB instead of an indication.

Figure 9A:
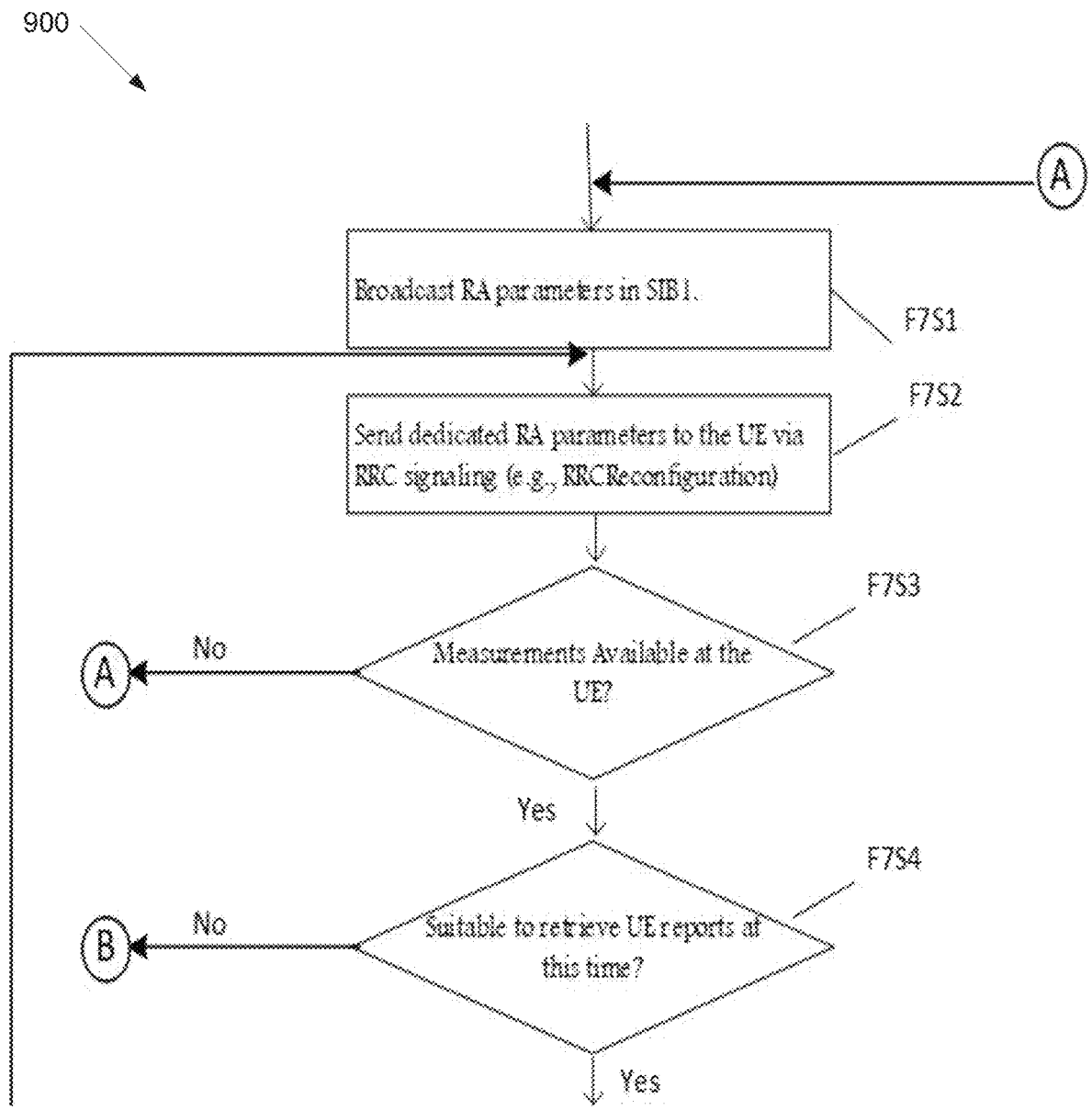
FIG. 9A illustrates an example of network procedure for enhanced RA reporting by the UE according to embodiments of the present disclosure.

FIG. 9A illustrates an example of network procedure 900 for enhanced RA reporting by the UE according to embodiments of the present disclosure. The network procedure 900 as may be performed by a BS (e.g., 101-102 as illustrated in FIG. 1). An embodiment of the network procedure 900 shown in FIG. 9A is for illustration only. One or more of the components illustrated in FIG. 9A can be implemented in specialized circuitry configured to perform the noted functions or one or more of the components can be implemented by one or more processors executing instructions to perform the noted functions.

Figure 9B:
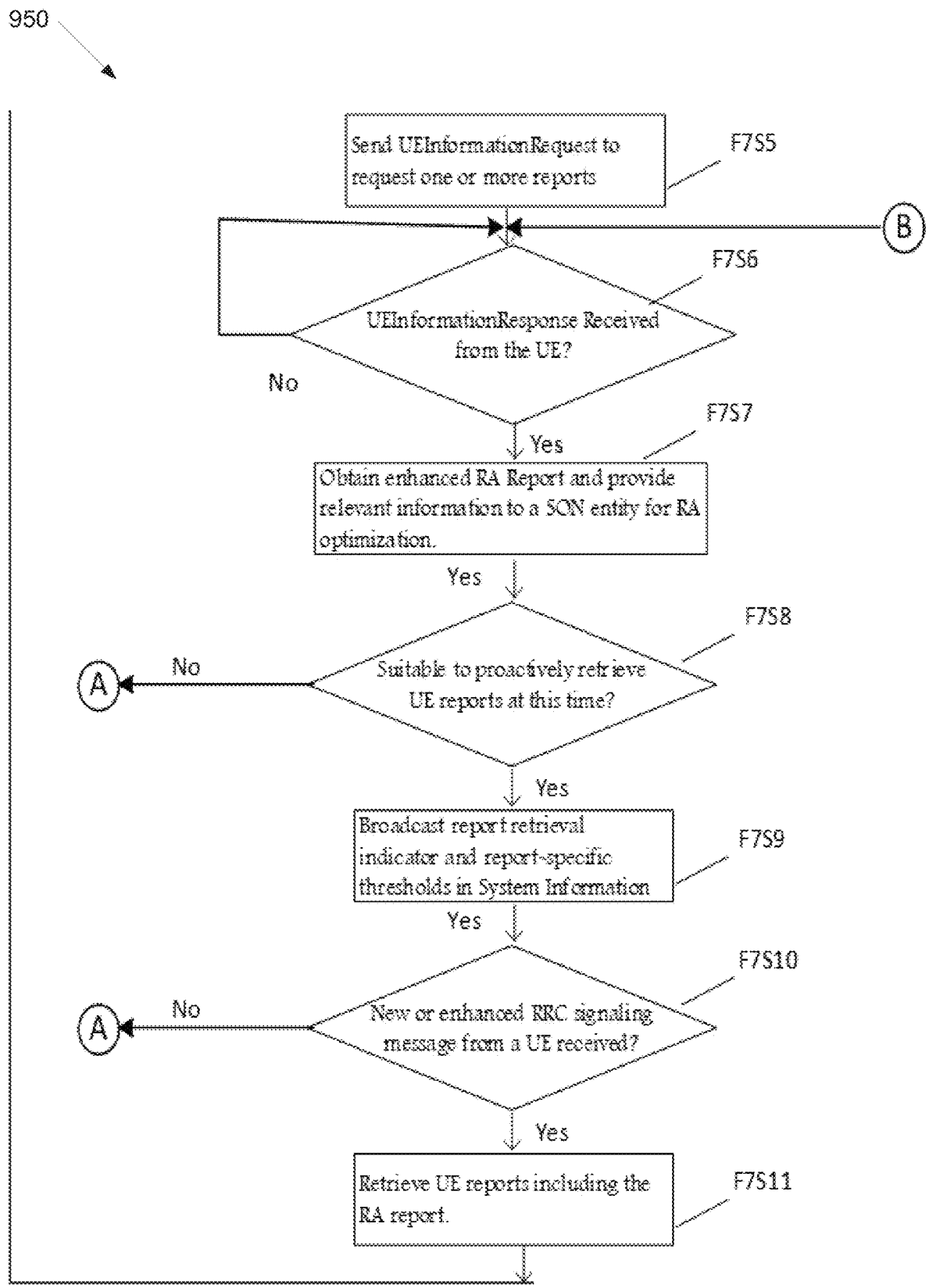
FIG. 9B illustrates another example of network procedure for enhanced RA reporting by the UE according to embodiments of the present disclosure.

FIG. 9B illustrates an example of network procedure 950 for enhanced RA reporting by the UE according to embodiments of the present disclosure. The network procedure 950 as may be performed by a BS (e.g., 101-102 as illustrated in FIG. 1). An embodiment of the network procedure 950 shown in FIG. 9B is for illustration only. One or more of the components illustrated in FIG. 9B can be implemented in specialized circuitry configured to perform the noted functions or one or more of the components can be implemented by one or more processors executing instructions to perform the noted functions.

The network procedures as illustrated in FIG. 9A is connected to the network procedure as illustrated in FIG. 9B. Step F7S4 in FIG. 9A is connected to Step F7S5 in FIG. 9B.

In Step F7S1, in an example approach, the gNB broadcasts RA parameters in SIB1. In an example approach, the gNB sends RA parameters in the IE servingCellConfigCommonSIB/UplinkConfigCommonSIB/BWP-UplinkCommon/ RACH-ConfigCommon and BWP-UplinkCommon/msgA-ConfigCommon. The UE uses these parameters to carry out 4-step and 2-step random access procedures in the cell.

In Step F7S2, in an example approach, the gNB provides the UE with UE-specific RA parameters in a dedicated RRC signaling message such as RRCReconfiguration message. In an example approach, the gNB specifies RA parameters in the IE rach-ConfigDedicated for a normal uplink and supplementary UL. This IE includes IEs such as CFRA (containing RACH-ConfigGeneric), RACH-ConfigGenericTwoStepRA, and msgA-PUSCH-Resource).

In Step F7S3, in an example approach, the gNB checks if a UE has indicated the availability of the RA report (and other reports such as CEF and RLF) in the IE UE-MeasurementsAvailable in RRC messages such as RRCResumeComplete and RRCReestablishmentComplete. If the UE has indicated such report availability, the gNB goes to Step F7S4. Otherwise, the gNB goes to Step F7S8.

In Step F7S4, the gNB decides if the gNB wants to retrieve the UE's reports (including the enhanced RA report for this disclosure). If yes, the gNB goes to Step F7S5. Otherwise, the gNB goes to Step F7S1.

In Step F7S5, the gNB sends to the UE an RRC signaling message such as UEInformationRequest requesting a report such as the RA report.

In Step F7S6, the gNB checks if the UE has responded with an RRC InformationResponse message. If yes, the gNB goes to Step F7S7. Otherwise, the gNB waits for such message for a period and goes to Step F7S1 after such period.

In Step F7S7, in an embodiment of the present disclosure, the gNB receives an enhanced RA report containing one or more of the new indicators and measurements specified in Step F6S3 of FIG. 9A. The gNB provides such UE-reported information to a SON entity responsible for RA optimization. If the gNB receives RSRP measurements in a compact representation, the gNB converts such representation into a regular value.

In Step F7S7, in an embodiment of the present disclosure, the gNB reports the thresholds such as the maximum E-UTRA/LTE power p-MaxEUTRA, the maximum NR power $P_{NR}$, the maximum EN-DC power $P_{Total}^{EN-DC}$, the maximum NE-DC power $P_{Total}^{NE-DC}$, and the maximum NR-DC power $P_{Total}^{NR-DC}$, (in dB values or linear values) to a SON entity in support of various flavors of MR-DC such as EN-DC, NE-DC, and NR-DC.

In Step F7S7, in an example approach, the gNB includes the transmit power configurations that the gNB specified to the UE for the random access procedure (e.g., preambleReceivedTargetPower and power step size) to a SON entity in support of the RA optimization.

In Step F7S8, in an example approach, the gNB decides the gNB wants to proactively seek UE's reports including the RA report. If yes, the gNB goes to Step F7S9. Otherwise, the gNB goes to Step F7S1.

In Step F7S9, in an embodiment of the present disclosure, the gNB broadcasts an indication in enhanced System Information (e.g., "reportRetrievalIndicator" or another IE that implies that the gNB wishes to retrieve the UE-stored reports including an RA report). In another embodiment, the gNB also broadcasts "reportRetrievalThreshold" to enable the UE to compare a random number with such threshold so that UE can determine if the UE needs to provide a report to the gNB or not.

In Step F7S9, in another approach, the gNB broadcasts multiple report-specific thresholds (e.g., RA report threshold, RLF report threshold, and CEF report threshold) so that the UE can evaluate if the UE needs to send a report or an indication of the report.

In Step F7S10, in an example approach, the gNB checks if enhanced or new RRC signaling message from the UE has been received or not. If yes, the gNB goes to Step F7S11. Otherwise, the gNB goes to Step F7S1.

In Step F7S11, in one example approach, the gNB obtains an indication about the report availability in a new RRC message (e.g., "ReportForSON"), an enhanced RRC message (e.g., RRC Setup Request and RRC Setup Complete), or an existing RRC message (e.g., RRCResumeComplete and RRCReestablishmentComplete). In another approach, the gNB directly obtains the report from the UE instead of an indication.

Figure 10:
FIG. 10 illustrates an example of mechanism of UE/gNB CEF recording and reporting according to embodiments of the present disclosure.

FIG. 10 illustrates an example of mechanism of UE/gNB CEF recording and reporting 1000 according to embodiments of the present disclosure. An embodiment of the mechanism of UE/gNB CEF recording and reporting 1000 shown in FIG. 10 is for illustration only.

FIG. 10 summarizes the overall mechanism of the UE/gNB CEF report CEF recording and reporting in support of coverage optimization by a SON entity.

In FIG. 10, the gNB, in an implementation-specific manner, considers expected CEF reports and the memory and processing requirements at the UE and the overall signaling requirements for CEF reporting to determine the CEF reporting configuration for UEs. The gNB conveys such CEF reporting configuration to UEs via System Information or dedicated RRC signaling. The UE considers the CEF reporting configuration and records compact CEF reports based on the CEF reporting configuration. The UE conveys compact CEF reports to the gNB. A SON entity receives CEF reports from the UE and possibly the gNB to detect coverage issues (e.g., DL and UL coverage imbalance) and adjust suitable parameters to optimize coverage in an implementation-specific manner.

Figure 11:
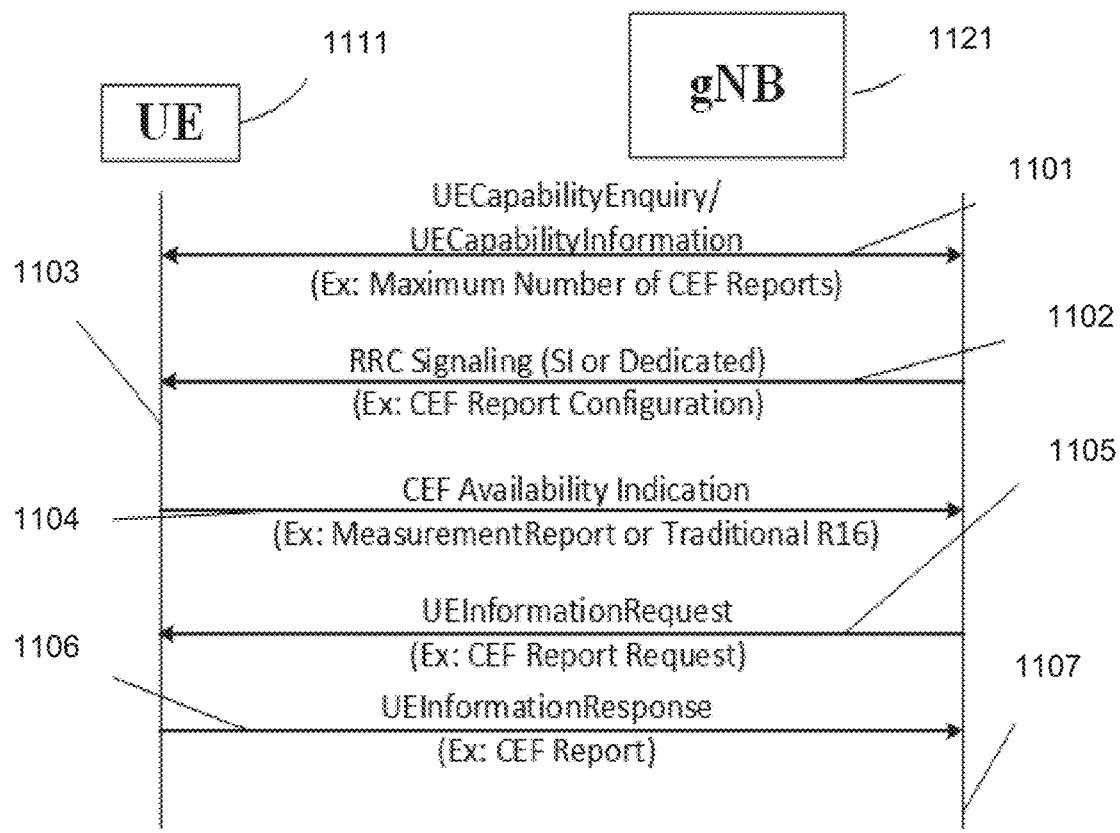
FIG. 11 illustrates an example of UE-network signaling procedure for CEF recording and reporting according to embodiments of the present disclosure.

FIG. 11 illustrates an example of UE-network signaling procedure 1100 for CEF recording and reporting according to embodiments of the present disclosure. The UE-network signaling procedure 1100 as may be performed by a UE (e.g., 111-116 as illustrated in FIG. 1) and a BS (e.g., 101-103 as illustrated in FIG. 1). An embodiment of the UE-network signaling procedure 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

FIG. 11 shows the overall UE-network signaling procedure to illustrate example embodiments of the present disclosure to enable the UE to convey CEF reports to the gNB. After the gNB receives such reports, the gNB conveys those reports along with possibly its own records to a suitable SON entity.

In Step 1101, in an example approach, the gNB and the UE exchange UECapabilityEnquiry and UECapabilityInformation messages. The UE conveys the maximum total number of CEF reports the UE can store at a given instant. The UE may make a distinct between regular CEF reports and compact CEF reports in an example approach. In another approach, the UE capability related to CEF reporting is not exchanged between the UE and the gNB. In other words, the UE does not convey such capability to the gNB. In another approach, the limit on the number of CEF reports is defined in specifications (e.g., as part of minimum UE requirements for SON/MDT).

In Step 1102, in an embodiment of the present disclosure, the gNB conveys CEF reporting configuration to the UE to include one or more of the following parameters: (1) the maximum number of CEF reports that the UE needs to store at a time (maxCEFReports); (2) the maximum duration for which the UE needs to store CEF reports (maxCEFReportDuration); (3) the maximum number of CEF reports per cell that the UE needs to store at a time (maxCEFReportsPerCell); (4) frequency-based or frequency band-based distance threshold(s) (distanceThresholdPerFrequencyBand); (5) GNSS accuracy threshold (thresholdForPositionAccuracy); (6) an indication of the type of the CEF report(s) (regular only, compact only, or both regular and compact); (7) an indication about the need for the velocity reporting (velocityReportingFlag); (8) signal measurement difference threshold (e.g., signalDifferenceThreshold or RSRPDifferenceThreshold); (9) absolute signal threshold (e.g., absoluteSignalThreshold or RSRPThreshold); (10) the velocity difference threshold (velocityDifferenceThreshold); (11) maximum number of neighbor cells that may reported in a given CEF report (maxNumberOfNeighborCellsPerCEFReport); and (12) an indicator that specifies whether to report the most recent report(s) or the oldest report(s) ("latestOldestReportFlag").

The parameters names used here are for notational convenience only; any other names can be used to serve the same purpose.

In an example approach, for one or more of these parameters, a distinction is made between a regular/traditional CEF report defined and used up to Release 16 and a new compact CEF report for use after Release 16.

In Step 1102, in another embodiment of the present disclosure, the gNB specifies the CEF reporting configuration via System Information. In another approach, the gNB specifies the CEF reporting configuration via dedicated RRC signaling (e.g., in an RRC Reconfiguration message).

In Step 1102, in yet another embodiment of the present disclosure, one or more of the parameters specified in the preceding paragraph (i.e., parameters (i) to (xii)) are excluded from radio interface signaling and are specified in the specifications. For example, "maxCEFReportDuration" may not be specified via System Information or dedicated RRC signaling but may be explicitly defined to be a certain period such as 24 hours (which is currently specified 48 hours in Release 16).

In Step 1102, in an embodiment of the present disclosure, the UE preserves and continues to use the previously-received CEF reporting congratulation unless superseded by a new CEF reporting configuration due to new System Information or new dedicated RRC signaling.

In Step 1103, in an embodiment of the present disclosure, the UE follows the CEF reporting configuration (defined in specifications and/or explicitly received from a gNB) and determines if the UE may evaluate conditions to detect a CEF based on the limits on the number of CEF reports and the setting of latestOldestReportFlag.

In Step 1103, if the UE has determined that the UE may evaluate conditions to detect a CEF, the UE further determines if there is a need to record a CEF report corresponding to the detected CEF in an example approach. For example, if the GNSS accuracy is poor (i.e., below thresholdForPositionAccuracy) or the distance between the current UE position and the UE position recorded in an existing CEF report for a given cell is short (i.e., below thresholdForPositionAccuracy), the UE does not create an additional CEF report in another example approach.

In Step 1103, additionally, if the UE decides to create a new CEF report, the UE creates a compact CEF report by skipping certain quantities (e.g., velocity is skipped) in an example approach.

In Step 1103, in yet another approach, if the UE decides to create a new CEF report, the UE creates a compact CEF report by restricting the number of reported neighbor cells (e.g., report a neighbor cell if it is stronger than the serving/reference cell or it is within signalDifferenceThreshold dB of the serving/reference cell).

In Step 1103, in another approach, if the UE decides to create a new CEF report, the UE creates a compact CEF report by recording a neighbor cell if its signal (e.g., RSRP) is stronger than absoluteSignalThreshold.

In Step 1103, in another approach, an additional limit on the number of neighbor cells may also be defined (maxNumberOfNeighborCellsPerCEFReport) to keep the size of a given report small.

In Step 1103, in another approach, to keep the CFR size small, transformed or adjusted RSRPs are reported instead of absolute RSRPs to report signal measurements.

In Step 1103, in yet another approach, indicators of whether a neighbor cell is above the serving/reference cell or within signalDifferenceThreshold dB of the serving/reference cell are recorded in a CEF report instead of actual signal measurements. In other words, instead of absolute or transformed (i.e., incremental or formula-based) RSRP or RSRQ values (e.g., RSRP=−100 dBm), indicators are recorded indicating whether RSRP of a neighbor cell is above the serving/reference cell or within signalDifferenceThreshold dB of the serving/reference cell. Indicators may be Boolean flags (above/below or true/false) or multi-level flags (e.g., one value if the neighbor cell is within signalDifferenceThreshold dB of the serving/reference cell and another value if the neighbor cell is within signalDifferenceThreshold2 dB of the serving/reference cell). The values such as signalDifferenceThreshold and signalDifferenceThreshold2 are specified by the gNB in Step F5S2 or defined in specifications.

In Step 1103, in an embodiment of the present disclosure, the first CEF report per cell may be a regular size report and all other reports for such cell are compact CEF reports.

In Step 1103, in an embodiment of the present disclosure, the UE stores N most recent CEF reports in the first option. In another embodiment of the present disclosure, the UE preserves N oldest reports in the second option, which reduces the UE processing compared to the first option.

In Step 1103, in an embodiment of the present disclosure, velocity is included in one CEF report per cell and excluded in all other reports for such cell.

In Step 1103, in an embodiment of the present disclosure, the UE includes the current velocity is in CEF report if the difference between the current velocity and the velocity in the reference CEF report exceeds a threshold (velocityDifferenceThreshold).

In Step 1104, the UE may use traditional RRC messages such as RRC setup request, RRC setup complete, RRCResumeComplete, and RRCReestablishmentComplete to provide an indication about the CEF report availability. In an embodiment of the present disclosure, the UE uses measurement report to provide an indication about the CEF report availability.

In Step 1104, in an embodiment of the present disclosure, the UE indicates the remaining amount of time for which the UE would keep the CEF report(s).

If a gNB wishes to retrieve the UE's reports (including the enhanced/compact CEF report(s)), the gNB in Step 1105 sends an RRC signaling message such as UEInformationRequest to request the CEF report(s) that the gNB wants to retrieve.

In Step 1106, the UE responds with an RRC UEInformationResponse message and provides the CEF report(s).

In Step 1107, the gNB processes the CEF report(s) and provides those along with possibly associated reports to a SON entity so that such SON entity can optimize coverage.

Figure 12A:
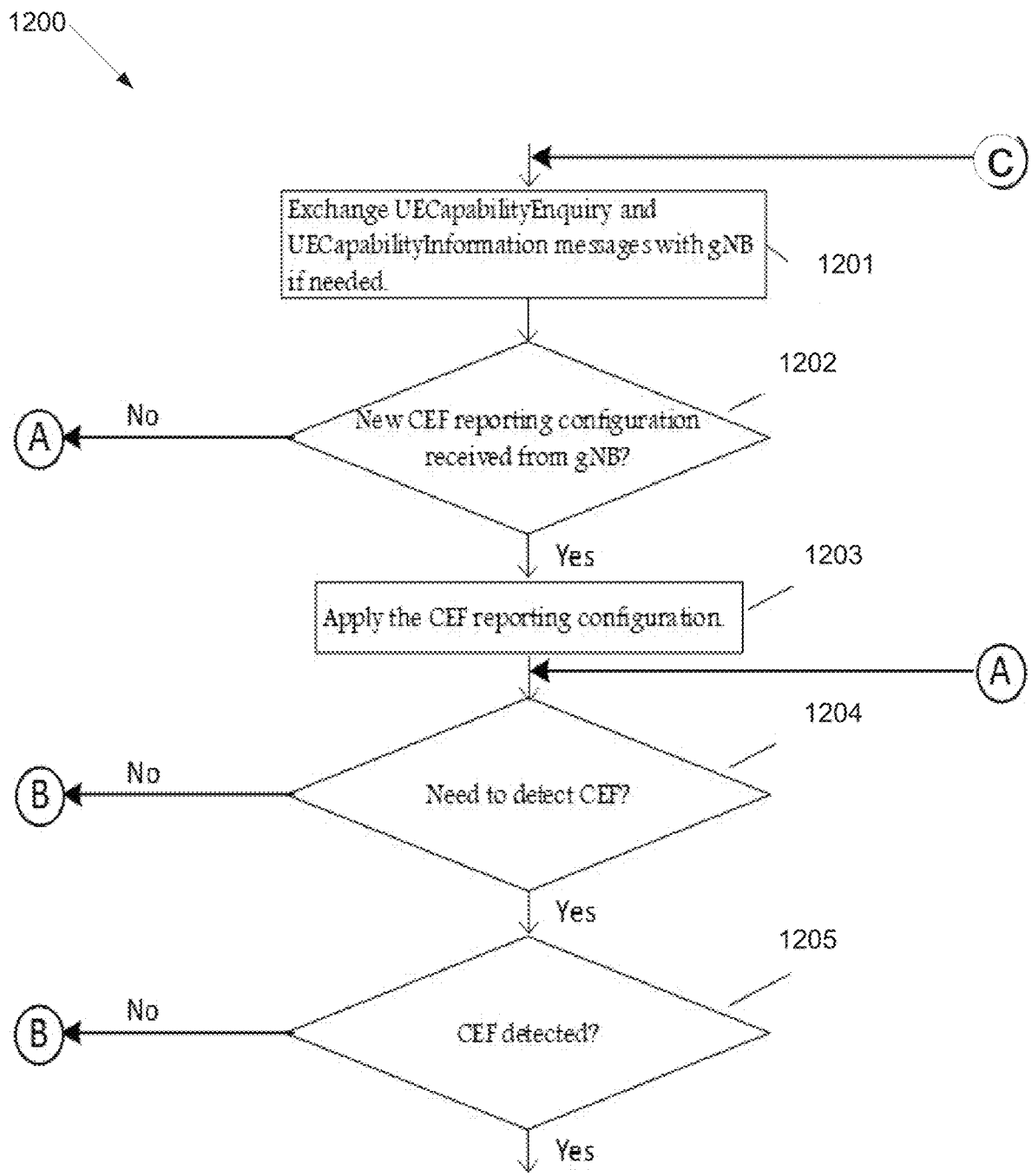
FIG. 12A illustrates an example of UE procedure for CEF recording and reporting according to embodiments of the present disclosure.

FIG. 12A illustrates an example of UE procedure 1200 for CEF recording and reporting according to embodiments of the present disclosure. The UE procedure 1200 as may be performed by a UE (e.g., 111-116 as illustrated in FIG. 1). An embodiment of the UE procedure 1200 shown in FIG. 12A is for illustration only. One or more of the components illustrated in FIG. 12A can be implemented in specialized circuitry configured to perform the noted functions or one or more of the components can be implemented by one or more processors executing instructions to perform the noted functions.

Figure 12B:
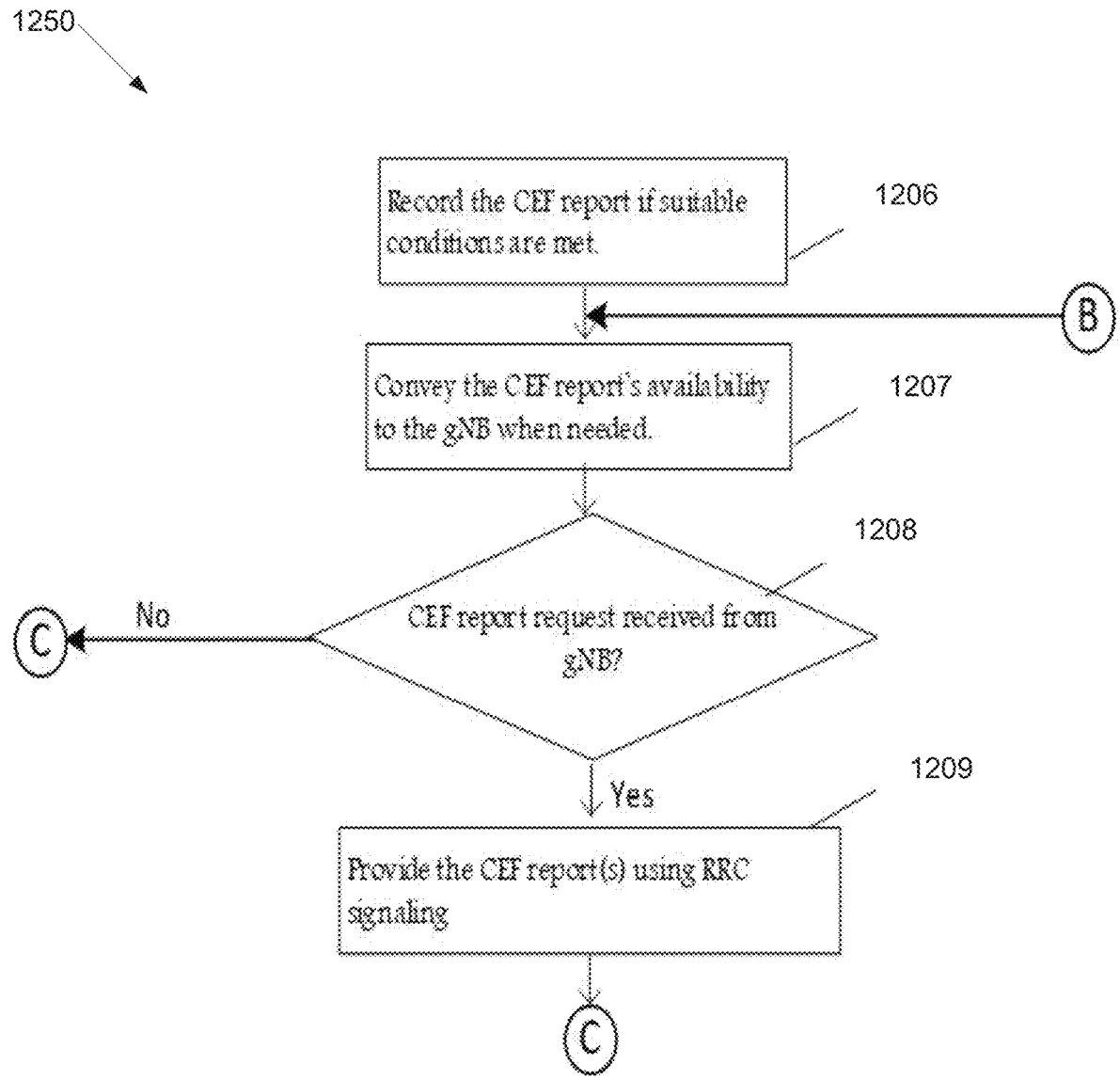
FIG. 12B illustrates another example of UE procedure for CEF recording and reporting according to embodiments of the present disclosure.

FIG. 12B illustrates an example of UE procedure 1250 for CEF recording and reporting according to embodiments of the present disclosure. The UE procedure 1250 as may be performed by a UE (e.g., 111-116 as illustrated in FIG. 1). An embodiment of the UE procedure 1250 shown in FIG. 12B is for illustration only. One or more of the components illustrated in FIG. 12B can be implemented in specialized circuitry configured to perform the noted functions or one or more of the components can be implemented by one or more processors executing instructions to perform the noted functions.

The UE procedure 1200 as illustrated in FIG. 12A and the UE procedure 1250 as illustrated in FIG. 12B are connected each other. For example, Step 1205 in FIG. 12A is connected to Step 1206 in FIG. 12B.

FIGS. 12A and 12B show the overall UE procedure to illustrate example embodiments of the present disclosure to enable the UE to convey CEF report(s) to the gNB.

In Step 1201, in an example approach, the UE exchanges UECapabilityEnquiry and UECapabilityInformation messages with the gNB. The UE conveys the maximum total number of CEF reports the UE can store at a given instant. The UE may make a distinct between regular CEF reports and compact CEF reports in an example approach. In another approach, the UE does not convey such CEF related capability to the gNB but relies on the parameter settings pre-defined in specifications (e.g., as part of minimum UE requirements for SON/MDT).

In Step 1202, the UE checks if the UE has received new CEF reporting configuration from the gNB via System Information or dedicated RRC signaling (e.g., via an RRCReconfiguration message). If the UE has, the UE goes to Step 1203. Otherwise, the UE goes to Step F6S4 if the UE has a default or prior configuration. If the UE does not have any CEF reporting configuration, the UE waits for such configuration to be specified by a gNB.

In Step 1203, in an example approach, the UE applies CEF reporting configuration such as one or more of the parameters (i.e., parameters (i) to (xii)) mentioned in Step 1202 for FIG. 11.

In Step 1204, the UE determines if the UE may evaluate conditions to detect a CEF.

If the UE decides not to evaluate the occurrence of a CEF, the UE goes to Step 1207. If the UE decides to evaluate the occurrence of a CEF, the UE goes to Step 1205.

In Step 1204, in an embodiment of the present disclosure, if the number of CEF reports recorded by the UE so far in its memory is less than maxCEFReports, the UE decides to evaluate the occurrence of a CEF. If the number of CEF reports recorded by the UE so far in its memory is the same as maxCEFReports and if latestOldestReportFlag has been provided to the UE and set to "latest," the UE decides to evaluate the occurrence of a CEF. If the number of CEF reports recorded by the UE so far in its memory is the same as maxCEFReports and if latestOldestReportFlag has been provided to the UE and set to "oldest," the UE decides not to evaluate the occurrence of a CEF.

In Step 1205, the UE checks if a CEF has occurred or not. If not, the UE goes to Step 1207. If yes, the UE goes to Step 1206.

In Step 1206, in an embodiment of the present disclosure, the UE determines if there is a need to record a CEF report corresponding to the detected CEF. In an example approach, if the GNSS accuracy is poor (i.e., the GNSS accuracy<thresholdForPositionAccuracy), the UE does not create an additional CEF report. In another example approach, if the distance between the current UE position and the UE position recorded in an existing CEF report for a given cell (=distanceDifference) is short (i.e., distanceDifference<distanceThresholdPerFrequencyBand), the UE does not create an additional CEF report. Note that this threshold is a function of the carrier frequency or the frequency band of the cell.

In Step 1206, in an embodiment of the present disclosure, the UE may create a regular-size CEF report all the time, a compact CEF report all the time or rule-based regular-size or compact CEF report per configuration by the gNB. In an example approach for the rule-based report type, the first report for a given cell may be a regular report and additional reports for that cell may be compact reports.

In Step 1206, if the UE decides to create a new CEF report, the UE creates a compact CEF report by skipping certain quantities (e.g., velocity is skipped) in an example approach.

In Step 1206, in yet another approach, if the UE decides to create a new CEF report, the UE creates a compact CEF report by restricting the number of reported neighbor cells (e.g., report a neighbor cell if it is stronger than the serving/reference cell or it is within signalDifferenceThreshold dB of the serving/reference cell).

In Step 1206, in another approach, if the UE decides to create a new CEF report, the UE creates a compact CEF report by recording a neighbor cell if its signal (e.g., RSRP) is stronger than absoluteSignalThreshold.

In Step 1206, in another approach, the UE does not include a neighbor cell if the UE has already reached the limit on the number of neighbor cells (i.e., maxNumberOfNeighborCellsPerCEFReport) to keep the size of a given report small.

In Step 1206, in another approach, to keep the CEF size small, the UE records transformed or adjusted RSRPs instead of absolute RSRPs to report signal measurements.

In Step 1206, in yet another approach, indicators of whether a neighbor cell is above the serving/reference cell or within signalDifferenceThreshold dB of the serving/reference cell are recorded by the UE in a CEF report instead of actual signal measurements. In other words, instead of absolute or transformed (i.e., incremental or formula-based) RSRP or RSRQ values (e.g., RSRP=−100 dBm), indicators are recorded indicating whether RSRP of a neighbor cell is above the serving/reference cell or within signalDifferenceThreshold dB of the serving/reference cell. Indicators may be Boolean flags (above/below or true/false) or multi-level flags (e.g., one value if the neighbor cell is within signalDifferenceThreshold dB of the serving/reference cell and another value if the neighbor cell is within signalDifferenceThreshold2 dB of the serving/reference cell). The values such as signalDifferenceThreshold and signalDifferenceThreshold2 are specified by the gNB in Step F5S2 or defined in specifications.

In Step 1206, in an embodiment of the present disclosure, the first CEF report per cell may be a regular size report and all other reports for such cell are compact CEF reports.

In Step 1206, in an embodiment of the present disclosure, the UE stores N most recent CEF reports in the first option. In another embodiment of the present disclosure, the UE preserves N oldest reports in the second option, which reduces the UE processing compared to the first option.

In Step 1206, in an embodiment of the present disclosure, velocity is included in one CEF report per cell and excluded in all other reports for such cell.

In Step 1206, in an embodiment of the present disclosure, the UE includes the current velocity is in CEF report if the difference between the current velocity and the velocity in the reference CEF report exceeds a threshold (velocityDifferenceThreshold).

In Step 1207, the UE indicates the availability of CEF report(s) to the gNB when the gNB sends an RRC message such as RRC setup request, RRC setup complete, RRCResumeComplete, RRCReestablishmentComplete and measurement report.

In Step 1208, the UE checks if the UE has received a CEF report request from the gNB in a UEInformationRequest message. If the UE has, the UE goes to Step 1209. Otherwise, the UE goes to Step 1201.

In Step 1209, the UE provides the available CEF report(s) to the gNB in an RRC message such as UEInformationResponse. The UE then goes to Step 1201.

Figure 13:
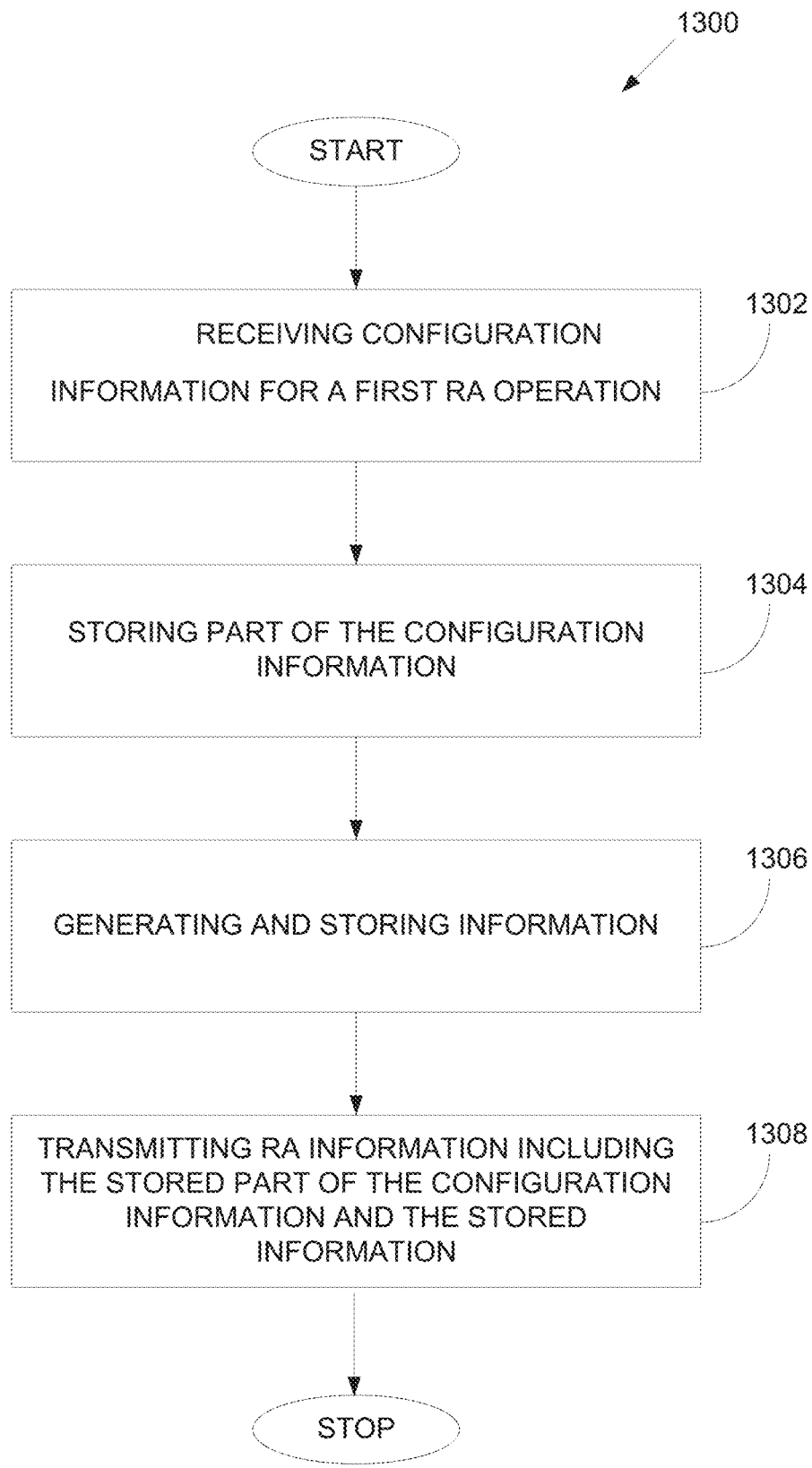
FIG. 13 illustrates an example of UE procedure for an RA operation according to embodiments of the present disclosure.

FIG. 13 illustrates a flowchart of method 1300 for a UE procedure for an RA operation according to embodiments of the present disclosure. The method 1300 as may be performed by a UE (e.g., 111-116 as illustrated in FIG. 1). An embodiment of the UE method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, the method 1300 begins at step 1302. In step 1302, a UE receives, from a BS, configuration information for a first RA procedure.

In step 1302, the first RA procedure is a 2-steps RA procedure using a message A (MsgA) for transmitting an RA preamble and uplink data and a MsgB for receiving an RA response.

Subsequently, in step 1304, the UE stores, in memory, part of the configuration information.

Next, in step 1306, the UE generates and stores information indicating that a fallback operation is triggered, during the RA operation, to a second RA procedure from the first RA procedure per RA attempt. In such embodiment, the second RA procedure is a 4-steps RA procedure using a message 1 (Msg1) for transmitting the RA preamble, a Msg2 for receiving the RA response, a Msg3 for transmitting the uplink data, and a Msg4 for receiving a contention resolution response.

Finally, in step 1308, the UE transmits, to the BS, RA information including the stored part of the configuration information and the stored information.

In one embodiment, the UE receives the configuration information via an SIB or an RRC message that is dedicated to the UE.

In one embodiment, the UE identifies a transmission power configuration information for the first RA procedure.

In one embodiment, the UE stores the transmission power configuration information.

In one embodiment, the UE generates and stores fallback operation information associated with a contention detection during the RA operation.

In one embodiment, the UE determines and stores at least one of: (1) information indicating whether the RA operation including the first RA procedure and the second RA procedure is triggered in an SUL carrier; (2) information indicating whether RSRP of a DL reference is less than a predetermined threshold; (3) information indicating whether a contention resolution is scheduled over a cross-carrier in a CA operation; or (4) information indicating whether a transmit power limitation of the UE is detected during the RA operation or whether a transmit power of the UE is reduced due to the transmit power limitation during the RA operation.

In one embodiment, the UE transmits, to the BS, indication information indicating whether the UE stores the information for the first RA procedure.

In one embodiment, the UE transmits, to the BS, the stored information based on the indication. In such embodiment, the configuration information includes an indication on whether the stored information for the first RA procedure is to be reported.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system for a random access (RA) operation, the UE comprising:
   memory;

a transceiver configured to receive, from a base station (BS), configuration information for a first RA procedure; and
a processor operably coupled to the memory and the transceiver, the processor configured to:
store, in the memory, part of the configuration information, and
generate and store information indicating that a fallback operation is triggered, during the RA operation, to a second RA procedure from the first RA procedure per RA attempt,
wherein the transceiver is further configured to transmit, to the BS, RA information including the stored part of the configuration information and the stored information.

2. The UE of claim 1, wherein the transceiver is further configured to receive the configuration information via a system information block (SIB) or a radio resource control (RRC) message that is dedicated to the UE.

3. The UE of claim 1, wherein the processor is further configured to:
identify a transmission power configuration information for the first RA procedure; and
store the transmission power configuration information.

4. The UE of claim 1, wherein the processor is further configured to generate and store fallback operation information associated with a contention detection during the RA operation.

5. The UE of claim 1, wherein the processor is further configured to determine and store at least one of:
first information indicating whether the RA operation including the first RA procedure and the second RA procedure is triggered in a supplementary uplink (SUL) carrier;
second information indicating whether reference signal received power (RSRP) of a downlink (DL) reference is less than a pre-determined threshold;
third information indicating whether a contention resolution is scheduled over a cross-carrier in a carrier aggregation (CA) operation; or
fourth information indicating whether a transmit power limitation of the UE is detected during the RA operation or whether a transmit power of the UE is reduced due to the transmit power limitation during the RA operation.

6. The UE of claim 1, wherein the transceiver is further configured to transmit, to the BS, indication information indicating whether the UE stores the information for the first RA procedure.

7. The UE of claim 1, wherein:
the configuration information includes an indication on whether the stored information for the first RA procedure is to be reported; and
the transceiver is further configured to transmit, to the BS, the stored information based on the indication.

8. The UE of claim 1, wherein:
the first RA procedure is a 2-steps RA procedure using a message A (MsgA) for transmitting an RA preamble and uplink data and a MsgB for receiving an RA response; and
the second RA procedure is a 4-steps RA procedure using a message 1 (Msg1) for transmitting the RA preamble, a Msg2 for receiving the RA response, a Msg3 for transmitting the uplink data, and a Msg4 for receiving a contention resolution response.

9. A base station (BS) in a wireless communication system for a random access (RA) operation, the BS comprising:
a processor; and
a transceiver operably coupled to the processor, the transceiver configured to:
transmit, to a user equipment (UE), configuration information for a first RA procedure; and
receive, from the UE, RA information including part of the configuration information and information indicating that the UE triggers a fallback operation, during the RA operation, to a second RA procedure from the first RA procedure per RA attempt,
wherein the part of the configuration information and the information are stored at the UE.

10. The BS of claim 9, wherein the transceiver is further configured to:
transmit, to the UE, the configuration information via a system information block (SIB) or a radio resource control (RRC) message that is dedicated to the UE; and
receive, from the UE, indication information indicating whether the UE stores the information for the first RA procedure.

11. The BS of claim 9, wherein:
the configuration information includes an indication on whether the stored information for the first RA procedure is to be reported; and
the transceiver is further configured to receive, from the UE, the stored information based on the indication.

12. The BS of claim 9, wherein:
the first RA procedure is a 2-steps RA procedure using a message A (MsgA) for transmitting an RA preamble and uplink data and a MsgB for receiving an RA response; and
the second RA procedure is a 4-steps RA procedure using a message 1 (Msg1) for transmitting the RA preamble, a Msg2 for receiving the RA response, a Msg3 for transmitting the uplink data, and a Msg4 for receiving a contention resolution response.

13. A method of a user equipment (UE) in a wireless communication system for a random access (RA) operation, the method comprising:
receiving, from a base station (BS), configuration information for a first RA procedure;
storing part of the configuration information;
generating and storing information indicating that a fallback operation is triggered, during the RA operation, to a second RA procedure from the first RA procedure per RA attempt; and
transmitting, to the BS, RA information including the stored part of the configuration information and the stored information.

14. The method of claim 13, further comprising receiving the configuration information via a system information block (SIB) or a radio resource control (RRC) message that is dedicated to the UE.

15. The method of claim 13, further comprising:
identifying a transmission power configuration information for the first RA procedure; and
storing the transmission power configuration information.

16. The method of claim 13, further comprising generating and storing fallback operation information associated with a contention detection during the RA operation.

17. The method of claim 13, further comprising determining and storing at least one of:
first information indicating whether the RA operation including the first RA procedure and the second RA procedure is triggered in a supplementary uplink (SUL) carrier;

second information indicating whether reference signal received power (RSRP) of a downlink (DL) reference is less than a pre-determined threshold;

third information indicating whether a contention resolution is scheduled over a cross-carrier in a carrier aggregation (CA) operation; or fourth information indicating whether a transmit power limitation of the UE is detected during the RA operation or whether a transmit power of the UE is reduced due to the transmit power limitation during the RA operation.

18. The method of claim 13, further comprising transmitting, to the BS, indication information indicating whether the UE stores the information for the first RA procedure.

19. The method of claim 13, further comprising transmitting, to the BS, the stored information on an indication, wherein the configuration information includes the indication on whether the stored information for the first RA procedure is to be reported.

20. The method of claim 13, wherein:

the first RA procedure is a 2-steps RA procedure using a message A (MsgA) for transmitting an RA preamble and uplink data and a MsgB for receiving an RA response; and the second RA procedure is a 4-steps RA procedure using a message 1 (Msg1) for transmitting the RA preamble, a Msg2 for receiving the RA response, a Msg3 for transmitting the uplink data, and a Msg4 for receiving a contention resolution response.

* * * * *